United States Patent [19]

Cavileer et al.

[11] 4,423,627
[45] Jan. 3, 1984

[54] FLOW METER

[76] Inventors: Watson V. Cavileer, Fullerton; Don B. Locy, Anaheim, both of Calif.

[21] Appl. No.: 310,634

[22] Filed: Oct. 13, 1981

Related U.S. Application Data

[63] Continuation-in-part of Ser. No. 187,605, Sep. 15, 1980, abandoned.

[51] Int. Cl.³ .............................................. G01F 1/20
[52] U.S. Cl. ........................................ 73/215; 222/40
[58] Field of Search ................... 73/215, 216; 222/40, 222/154

[56] References Cited

U.S. PATENT DOCUMENTS

| 187,623 | 2/1877 | Hambleton . | |
| 275,765 | 4/1883 | Hesse . | |
| 2,165,705 | 7/1939 | Houser | 73/215 |
| 2,767,581 | 10/1956 | Moorehead | 73/215 |
| 3,296,854 | 1/1967 | Morgan | 73/118 |
| 3,392,580 | 7/1968 | Bain et al. | 73/215 |
| 3,835,885 | 9/1974 | Kreyenberg | 137/551 |
| 3,882,724 | 5/1975 | Hearn | 73/215 |
| 4,169,386 | 10/1979 | McMahan | 73/700 |

FOREIGN PATENT DOCUMENTS 120671  11/1918  United Kingdom ................. 73/216

Primary Examiner—Herbert Goldstein
Attorney, Agent, or Firm—Gausewitz, Carr, Rothenberg & Edwards

[57] ABSTRACT

This invention provides a fluid flow meter including an elongated tube and an element adapted for connection to a fluid line, the elongated tube including one or more orifice openings of predetermined area, and indicia correlated with the area of the orifice opening for providing a reading of fluid flow dependent upon the level to which fluid rises in the elongated tube.

In one embodiment the tube includes a plurality of scales for indicating different ranges of flow rates, and an orifice opening corresponding to each of said scales, said orifice openings being of different areas and selectively openable so that said scales can individually be made to show fluid flow rates.

8 Claims, 12 Drawing Figures

U.S. Patent  Jan. 3, 1984  Sheet 1 of 2  4,423,627
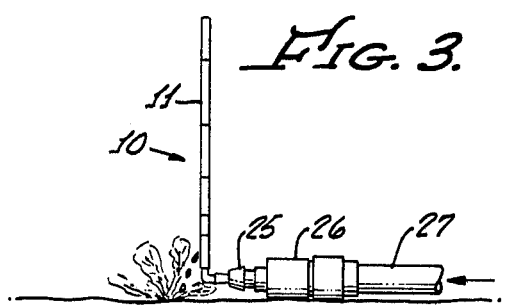
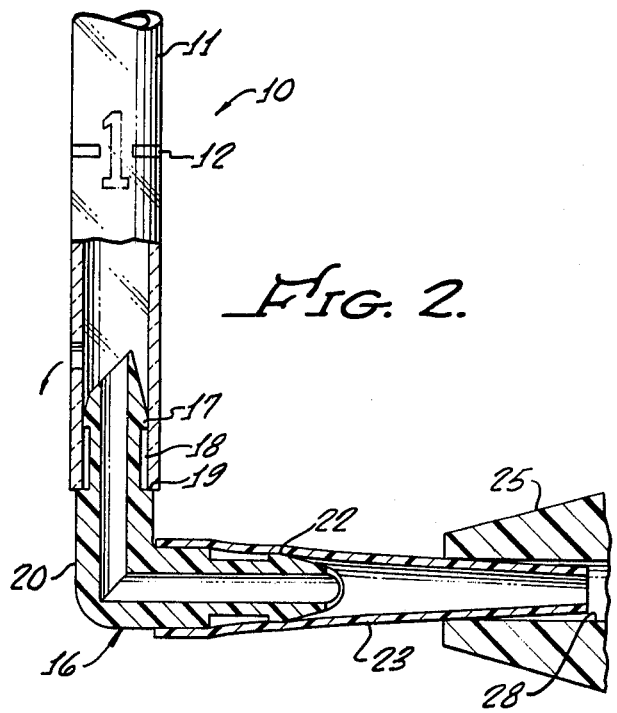
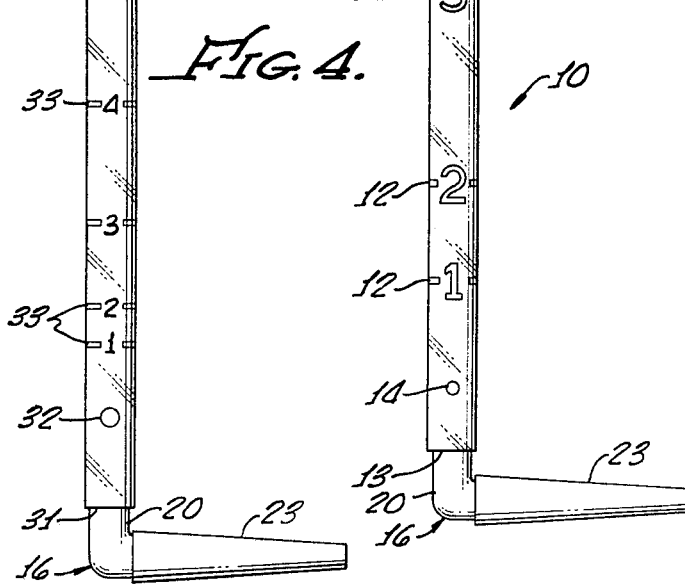

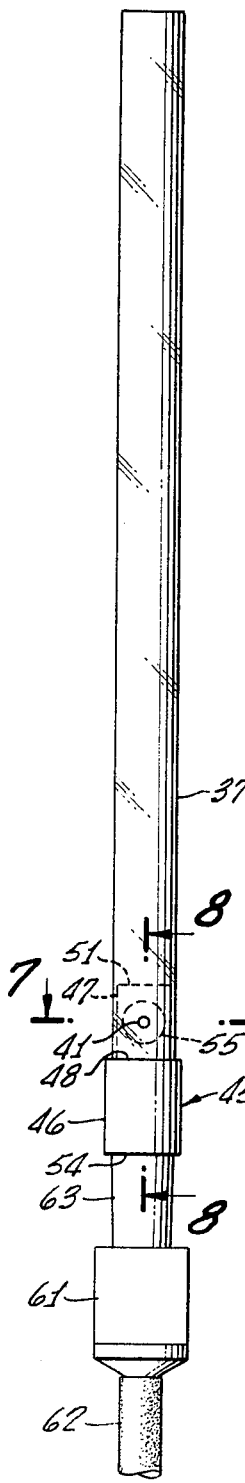
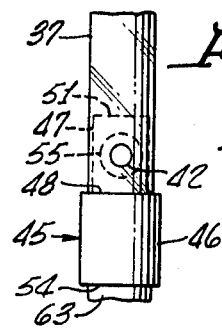
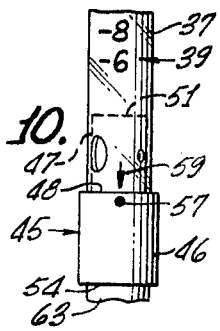
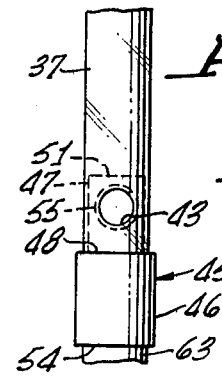
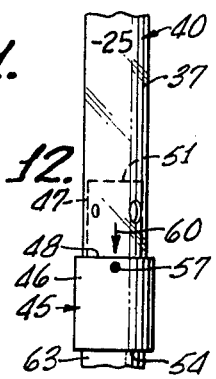
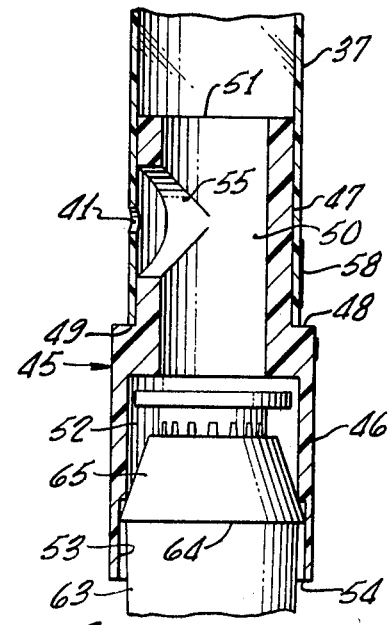
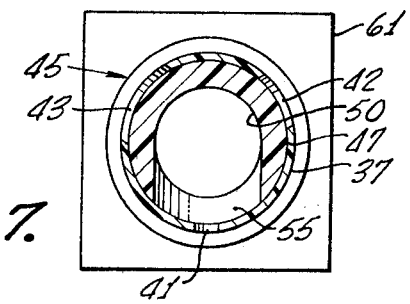

4,423,627

FLOW METER

CROSS-REFERENCE TO RELATED APPLICATION

This application is a continuation-in-part of our co-pending patent application Ser. No. 187,605, filed Sept. 15, 1980, for a Flow Meter, now abandoned.

BACKGROUND OF THE INVENTION

For agricultural and other uses there exists a need for a low-cost, accurate, reliable, and easily used flow meter. One area of such need is in drip irrigation systems where there may be a number of trees to which fluid lines extend, with the flow in each line being controlled by a valve. It is necessary to regulate the flow to each tree so that it is given neither too much nor too little water. A common and unsatisfactory expedient has been to utilize a measuring cup to receive the water and a stopwatch to measure the time in which a given amount of water enters the cup. Obviously, this is time consuming and inconvenient. The alternative has been the use of an expensive float-type meter which requires careful handling and maintenance.

SUMMARY OF THE INVENTION

The present invention provides an improved flow meter which is of low cost, is maintenance free, durable, and is easy to use. The device is a simple unit with no moving parts during operation. One end of the unit may include an outwardly tapered tube adapted to fit within and form a temporary seal at a fluid discharge line. This tapered tube connects through a 90° elbow to an elongated straight tube which is positioned vertically when the fluid flow is being measured. At the lower end of the tube is an orifice opening, above which is a scale for indicating the quantity of fluid flow. The tube is frictionally held on the elbow and rotatable relative to it, which permits positioning of the scale in the best location for viewing it.

When the device is connected to a fluid line, the fluid will flow through the tapered tube and the elbow into the straight tube. There some of the fluid will discharge through the orifice opening and the remainder will rise in the tube to a level which is dependent upon the rate of flow in the line. The area of the orifice opening is correlated with the scale on the straight tube to enable a direct reading of flow rate to be made. Consequently, it is a simple matter to associate the flow meter with a fluid discharge line and regulate the rate of flow in the line to a desired value.

Because of the relationship of the column of liquid in the tube with respect to flow rate, there is a rapid expansion of the length of the scale upwardly as flow rates increase. This means that for high flow rates the length of the tube would have to be too long to be practical and simple to use. This difficulty is avoided by the inclusion of a second orifice opening outwardly in the tube, beyond which is a second scale correlated to the area of both the first and second orifice openings. Thus, when the liquid reaches the second orifice opening, there is more area for discharge of the liquid and the scale for indicating flow rate is condensed considerably. If desired under some circumstances, there may be three or more discharge orifices spaced outwardly along the tube.

In another embodiment, the tube includes a plurality of scales on its wall for indicating different ranges of flow rates. An orifice opening of appropriate area is provided for each of the scales. A sleeve telescopes relative to the tube and has an opening at least as large as the largest of the orifice openings in the tube. Therefore, the tube and sleeve may be relatively rotationally positioned to open a selected one of the orifice openings while closing the others, thereby rendering the corresponding scale operative. In this manner, the flow meter is easily adjusted to give a direct and accurate reading in several flow ranges. Indicia on the sleeve and tube show which of the scales and orifices have been selected.

BRIEF DESCRIPTION OF THE DRAWINGS

FIG. 1 is a side elevational view of the flow meter of this invention;

FIG. 2 is an enlarged fragmentary sectional view of the lower portion of the flow meter;

FIG. 3 is a side elevational view of the flow meter associated with a fluid line;

FIG. 4 is a side elevational view of a modified form of the invention used for higher flow rates;

FIG. 5 is a front elevational view of another embodiment of the invention which is adjustable for indicating different flow ranges;

FIG. 6 is a rear elevational view of the flow meter of FIG. 5;

FIG. 7 is an enlarged transverse sectional view taken along line 7—7 of FIG. 5;

FIG. 8 is an enlarged fragmentary longitudinal sectional view taken along line 8—8 of FIG. 5;

FIG. 9 is a fragmentary front elevational view of the flow meter in a different position of adjustment;

FIG. 10 is a fragmentary rear elevational view of the flow meter adjusted as in FIG. 9;

FIG. 11 is a fragmentary front elevational view of the flow meter in a third position of adjustment; and FIG. 12 is a fragmentary rear elevational view of the flow meter adjusted as in FIG. 11.

DETAILED DESCRIPTION OF THE INVENTION

The flow meter 10 illustrated in the drawing is particularly adapted for use in drip irrigation systems. It includes an elongated tube 11 of transparent plastic material open at both its ends. A scale 12 is marked on the tube 11 together with numbers which indicate the rate of flow, as explained below. The scale is not linear, having progressively greater distances between the markings of the scale in the vertical direction toward the higher numbers, as the device is illustrated. Spaced upwardly a short distance from the lower end 13 of the tube 11 is an orifice 14.

A 90° elbow 16, also of plastic material, is at the lower end 13 of the tube 11 with an end portion 17 of the elbow being inserted into the tube (see FIG. 2). The tip end of the elbow is frustoconical in shape, facilitating its entry into the tube 11, and it frictionally grips the wall of the tube at the base of the frustoconical portion. This holds the elbow and tube together, as well as forming a seal at this location. This also allows the tube 11 to be rotated relative to the elbow so that the scale 12 can be positioned where it is most readily viewed. This is especially important in irrigation systems where there may be plant growth limiting access to the location where the flow is being calibrated. Inwardly of the frustoconical end portion 17, the elbow has a portion 18 of reduced diameter connecting through a radical shoulder 19 to the central portion 20 of the elbow. The shoulder 19 bears against the end 13 of the tube 11, which positions the tube 11 axially relative to the elbow 16.

The other end 22 of the elbow 16 is similar and fits within a tapered plastic tube 23. The latter element, which converges outwardly away from the elbow 16, extends over a part of the central section 20 of the elbow, engaging the elbow with a friction fit that also provides a seal.

The flow meter 10 is used by inserting the tapered tube 23 into a component of the fluid line which is to be measured. In the example illustrated, the tube 23 is fitted into the outlet end 25 of a valve 26 which is at the end of a fluid line 27 forming a portion of a drip irrigation system. The outlet 25 of the valve 26 defines a cylindrical bore 28 into which the tapered tube 23 is wedged, forming a temporary attachment and a seal. The flow meter is positioned so that the tube 11 is vertical.

Water flowing through the valve 26 passes through the elbow 16 and enters the tube 11. A portion of the liquid is discharged outwardly through the orifice opening 14. Another quantity of the liquid rises in the tube 11 to a level which is indicative of the volume of flow in the line 27. In the example illustrated, if the liquid rises to the height of the marking at the numeral 3 on the tube 11, this will show a flow of three gallons per hour in the line 27. The flow rate may be set by further opening or closing of the valve 26 to achieve a desired volume as indicated by the level of the column of liquid in the tube 11.

The theory of operation of the flow meter 10 is found in the formula $Q=CA\sqrt{2gh}$, where Q=flow in cubic feet per second, C=contraction coefficient of the orifice opening 14, which is dependent upon the edge shape of this opening, A=the area of the orifice opening, g=the acceleration constant of gravity, feet per second per second, and h=the height in feet of the liquid in the tube 11. From this relationship the diameter of the orifice opening 14 can be selected and the indicia markings 12 inscribed on the tube 11 at the appropriate locations to make a direct reading of flow in gallons per hour or such other units as the circumstance requires.

The orifice opening may be positioned in the elbow 16 instead of the tube 11. However, the flow meter is more easily manufactured by forming this opening in the tube 11, as illustrated. This requires some adjustment of the scale 12 to reflect a higher position of the orifice than that of the base of the column of liquid.

Because flow varies in proportion to the square root of the height of the column of liquid in the tube 11, the scale 12 becomes increasingly spread out as flow volume increases. In other words, the distance between adjacent scale markings 12 increases as the higher flow values are realized. This means that for a flow meter capable of measuring higher rates of flow a very long tube 11 would be required. It becomes impractical to construct a flow meter of the type of FIG. 1 capable of measuring higher flow rates because the very long tube 11 is unwieldy and difficult to use. The problem is alleviated by the modification illustrated in FIG. 4. Here the tube 30 corresponds to the tube 11 and is associated with an elbow end tapered as in the previously described embodiment. The length of the tube 30 may be the same as that of the tube 11. Adjacent the lower end 31 of the tube 30 is an orifice opening 32 to bleed out a portion of the liquid which enters the flow meter. Above the opening 32 is a scale 33 similar to the scale 12 in the previously described embodiment. However, the diameter of the orifice opening 32 is selected so as to compress the scale 33 as compared with the scale 12. This means that the opening 32 is given a greater area than that of the opening 14, so that a flow volume of five gallons per hour, at the upper end of the scale 33, is indicated approximately at the midpoint of the tube 30.

Above the scale 33 is a second orifice opening 34, beyond which is a second scale 35. The latter scale extends to the upper end portion of the tube 30, indicating a flow rate of 10 gallons per hour at the upper extremity.

In operation, the flow meter indicates flow up to five gallons per hour in the manner described for the flow meter 10. At a flow rate of between five and six gallons per hour, the liquid level in the tube 11 reaches the second orifice opening 34. At this point a greater quantity of liquid can bleed out of the flow meter because fluid is discharged through both the orifice opening 32 and the orifice opening 34. With this greater flow through the flow meter automatically increasing the area of discharge, the second scale 35 becomes greatly compressed and can be accommodated on the tube 30. By this technique the flow meter may be of a small and easily handled size and will switch from one scale to the other as flow rates increase to indicate a larger range of flow volumes.

In the embodiment of FIGS. 5 through 12, the flow meter is adjustable to give readings within different ranges of flow. This embodiment includes an open-ended transparent tube 37, normally of plastic, on which are three scales 38, 39 and 40 for indicating three different flow ranges. For example, the scale 38 may be for flow rates of from one to five gallons per hour, scale 39 for flow rates of six to twenty-four gallons per hour, and scale 40 for flow rates of twenty-five to fifty gallons per hour. The tube 37, near its base and beyond the scales 38, 39 and 40, includes three outlet orifices 41, 42 and 43. These outlet orifices have their centers in the same radial plane through the tube and are of different sizes. The orifices are for discharging liquid selectively to enable the different scales 38, 39 and 40 to indicate the flow rate, depending upon the range of flow. Each of these openings is on the side of the tube diametrically opposite from the one of the scales 38, 39 and 40, to which it corresponds. Thus, the orifice 41, of smallest size, is opposite from the scale 38, the intermediate sized orifice 42 is opposite from the scale 39, and the largest orifice 43 is opposite from the scale 40.

A plastic sleeve 45 includes a lower end portion 46 of relatively large outside diameter and an upper end portion 47 of smaller outside diameter. A radial shoulder 48 interconnects these two sections. The upper end portion 47 fits within the lower end of the tube 37 with the radial lower end edge 49 of the tube engaging the shoulder 48. A friction fit holds the tube 37 on the end portion 47 of the sleeve 45 while permitting relative rotation of these two members.

Internally, the sleeve 45 includes a bore section 50 that extends from its upper end 51 to a location beyond the external shoulder 48. The intermediate bore portion 52 is larger than the bore 50 and a counterbore 53 extends inwardly from the lower end 54 of the sleeve 45.

Extending through the wall of the upper portion 47 of the sleeve 45, between the upper end 51 and the shoulder 48, is an opening 55 which is of larger diameter than the largest orifice 43 through the wall of the tube 37. The opening 55 is positioned the same distance from the shoulder 48 as the orifices are from the lower end 49 of the tube 37, so that the opening 55 can be in registry with any one of the orifice openings 41, 42 and 43, depending upon the relative rotational positions of the tube and the sleeve 45.

In use of the flow meter of FIGS. 5 through 12, the tube 37 and sleeve 45 are rotationally positioned to bring the desired scale of flow rates into position for operation. If, for example, flow in the range of one to five gallons per hour is to be measured, the opening 41 is placed in registry with the opening 55 through the sleeve 45, as shown in FIGS. 5 through 8. The opening 41 is of an area such that it can discharge liquid entering the sleeve 45 at a rate to cause the level to which the liquid rises in the tube 37 to indicate total flow rate on the scale 39.

There are markings on the tube 37 and sleeve 45 to facilitate alignment of the appropriate orifice in the tube 37 with the opening 55 in the sleeve. This includes a mark 57 on the lower portion 46 of the sleeve 45, adjacent the shoulder 48 and on the side opposite from the opening 55. On the sleeve 37 are arrows 58, 59 and 60 beneath the scales 38, 39 and 40, respectively. Alignment of one of these arrows with the mark 57 means that the orifice of the scale directly above is in registry with the opening 55 in the sleeve 45 so that that scale is made functional. In the example of FIGS. 5 through 8, therefore, the arrow 58 is in alignment with the mark 57, indicating that the scale 38 above the arrow 58 will show the flow rate because the orifice 41 then coincides with the opening 55 and is in a position to discharge fluid.

As shown in FIGS. 5, 6 and 8, the outlet of a valve 61, which is attached to a fluid transmitting line 62, is inserted into the lower end of the sleeve 45. The outlet of the valve illustrated includes an elongated frustoconical portion 63, which tapers at a shallow angle toward the valve body and connects through a shoulder 64 to a frustoconical end portion 65 that tapers toward the outer end. The corner of the outer tapered portion 65, adjacent the shoulder 64, engages the wall of the counterbore 53 of the sleeve 45, and the wall of the portion 65 engages the corner at the end of the bore section 52 so that a fluid-tight connection is made to the flow meter. Then the liquid discharging from the valve 61, which in this instance is water used in an irrigation system, flows into the fluid passageway that the flow meter defines, first entering the sleeve 45. Some of this water rises in the tube 37 while the orifice 41 discharges the remainder of the water. In the manner described above, the scale 38 then gives a reading of the flow rate.

FIGS. 9 and 10 are opposite views of the flow meter adjusted so that the intermediate orifice 42 is registered with the opening 55 and the scale 39 is functional to measure flow in the range of six to twenty-four gallons per hour. Similarly, FIGS. 11 and 12 show the opposite sides of the flow meter in the third position where the largest orifice 43 coincides with the opening 55 and the scale 40 will indicate the fluid flow rate in the rage of twenty-five to fifty gallons per hour.

It is a simple matter to relatively rotate the tube 37 and the sleeve 45 to render any of the scales operative with its orifice registering with the discharge opening 55 in the sleeve 45. In fact, if it is attempted to use one of the scales and it proves to be the wrong one, the flow meter readily is adjusted while in position on the discharging device to cause another one of the scales to come into use so that the meter will give the proper range of flow.

Although there is no difficulty in aligning the arrows 58, 59 and 60 with the mark 57, precise positioning is not necessary. This is because the opening 55 is larger than even the largest orifice 43 and allows the orifice to discharge without obstruction even though the center of orifice does not exactly coincide with the center of the opening 55.

The foregoing detailed description is to be clearly understood as given by way of illustration and example only, the spirit and scope of this invention being limited solely by the appended claims.

We claim:

1. A flow meter for measuring the volume of fluid flow comprising
    fluid passageway means connectable to a fluid transmitting member,
    a plurality of scales of indicia on said fluid passageway means for indicating different ranges of fluid flow rates,
        said fluid passageway means defining an orifice opening for each of said scales, each of said orifice openings having a predetermined area correlated with said indicia of the one of said scales therefor causing said indicia to indicate the quantity of fluid flow in said fluid transmitting member in accordance with the level of fluid in said fluid passageway means,
    means for selectively opening each of said orifice openings for allowing fluid in said fluid passage means to discharge therefrom while closing the remaining ones of said orifice openings for causing the indicia of the corresponding one of said scales to so indicate fluid flow,
    said fluid passageway means including:
        a tube having a light transmissive wall to permit the level of fluid therein to be seen through said wall,
            said orifice openings being adjacent one end of said tube, and a sleeve having a portion telescoped with respect to said tube and rotatable relative thereto,
            said sleeve having an opening through the wall thereof at least as large as the largest of said orifice openings, whereby at selected rotational positions of said tube relative to said sleeve a selected one of said orifice openings is in registry with said opening in said sleeve so that fluid received in said sleeve can discharge through said opening in said sleeve and one of said orifice openings and can rise in said tube for indicating fluid flow rate.

2. A device as recited in claim 1 including additional indicia to indicate which of said orifice openings is so opened and which one of said scales is so caused to indicate fluid flow.

3. A device as recited in claim 1 in which said scales are rotationally spaced around said fluid passageway means, and in which each of said orifice openings is opposite from the one of said scales therefor.

4. A device as recited in claim 1 in which said sleeve includes a first portion for a first outside diameter received within one end portion of said tube and rotatably retained therein by a friction fit, a second portion of a second and larger outside diameter exteriorly of said tube, and a shoulder between said first and second portions, said tube having a radial end surface engaging said shoulder, said opening in said sleeve being through the wall of said first portion.

5. A device as recited in claim 4 including an indicia on said first portion of said sleeve, and a plurality of indicia on said one end portion of said tube selectively alignable with said indicia on said first portion at different relative rotational positions of said sleeve and said tube for indicating which one of said scales will indicate the flow rate of fluid entering said sleeve and said tube.

6. A device as recited in claim 5 in which said opening in said sleeve is positioned on the opposite side of said sleeve from said indicia on said first portion, and said plurality of indicia on said one end of said tube include one indicia on the side of said tube opposite from each of said orifice openings.

7. A device as recited in claim 6 in which each of said indicia on said one end portion of said sleeve is aligned with one of said scales.

8. A flow meter for measuring the volume of fluid flow comprising
  a tube having a light transmissive wall to permit the level of fluid therein to be seen through said wall, said tube having a plurality of orifice openings therethrough,
  a plurality of scales of indicia for indicating different ranges of fluid flow rates with respect to the level of fluid in said tube, and a sleeve connectable to a source of fluid, said sleeve having a portion telescoped with respect to said tube and rotatable relative thereto,
  said sleeve having opening means therethrough registrable with selected orifice openings in predetermined relative rotational positions of said sleeve and said tube for causing different orifice openings to discharge fluid from said tube and said indicia of different ones of said scales to indicate fluid flow in accordance with the level of fluid in said tube.

* * * * *